(12) United States Patent
Phan

(10) Patent No.: US 11,115,195 B2
(45) Date of Patent: Sep. 7, 2021

(54) AUTHENTICATION SERVER OF A CELLULAR TELECOMMUNICATION NETWORK AND CORRESPONDING UICC

(71) Applicant: GEMALTO SA, Meudon (FR)

(72) Inventor: Ly Thanh Phan, Gemenos (FR)

(73) Assignee: THALES DIS FRANCE SA, Meudon (FR)

(*) Notice: Subject to any disclaimer, the term of this patent is extended or adjusted under 35 U.S.C. 154(b) by 306 days.

(21) Appl. No.: 16/325,304

(22) PCT Filed: Jul. 27, 2017

(86) PCT No.: PCT/EP2017/069073
§ 371 (c)(1),
(2) Date: Feb. 13, 2019

(87) PCT Pub. No.: WO2018/033364
PCT Pub. Date: Feb. 22, 2018

(65) Prior Publication Data
US 2019/0208419 A1    Jul. 4, 2019

(30) Foreign Application Priority Data
Aug. 17, 2016    (EP) .................... 16306062

(51) Int. Cl.
*H04L 9/08*    (2006.01)
*H04L 9/32*    (2006.01)
(Continued)

(52) U.S. Cl.
CPC .......... *H04L 9/0841* (2013.01); *H04L 9/3213* (2013.01); *H04L 9/3234* (2013.01);
(Continued)

(58) Field of Classification Search
CPC ... H04L 9/0841; H04L 9/3242; H04L 9/3213; H04L 63/0876; H04L 9/3234; H04L 9/3273; H04L 2209/80; H04W 12/069
See application file for complete search history.

(56) References Cited

U.S. PATENT DOCUMENTS 7,574,599 B1*    8/2009    Zhang .................. H04L 9/3242
                                                        713/168
8,953,793 B2    2/2015    Norrman et al.
(Continued)

FOREIGN PATENT DOCUMENTS

EP    1 515 507 A1    3/2005

OTHER PUBLICATIONS

Office Action dated Aug. 25, 2020, by the India Patent Office in corresponding India Patent Application No. 201917005127 and English translation of the Office Action. (6 pages).
(Continued)

*Primary Examiner* — Henry Tsang
(74) *Attorney, Agent, or Firm* — Buchanan Ingersoll & Rooney PC

(57) ABSTRACT

The invention proposes an authentication server of a cellular telecommunication network, the authentication server being arranged for generating an authentication token to be transmitted to a telecommunication terminal, the authentication token comprising a message authentication code and a sequence number, wherein the message authentication code is equal to:

$$MACx = KIdx \text{ XOR } f1(AMF, SQNx, RAND, K)$$

with KIdx being a key index information in the form of a bias of a MAC equal to:

$$MAC = f1(K, AMF, SQNx, RAND)$$

(Continued)

with f1 being a function, K a key, RAND a random number and SQNx a sequence counter relative to a corresponding key Kx derived from the key K and KIdx, and AMF the content of an authentication management field as defined in 3GPP TS 33.102.

4 Claims, 3 Drawing Sheets

(51) Int. Cl.
*H04W 12/069* (2021.01)
*H04L 29/06* (2006.01)

(52) U.S. Cl.
CPC .......... *H04L 9/3242* (2013.01); *H04L 9/3273* (2013.01); *H04L 63/0876* (2013.01); *H04W 12/069* (2021.01); *H04L 2209/80* (2013.01)

(56) References Cited

U.S. PATENT DOCUMENTS

| | | | | |
|---|---|---|---|---|
| 2007/0005986 | A1* | 1/2007 | Bernard | H04W 12/065 713/185 |
| 2007/0297367 | A1* | 12/2007 | Wang | H04L 63/0414 370/331 |
| 2011/0167272 | A1* | 7/2011 | Kolesnikov | H04L 9/3271 713/171 |
| 2013/0156182 | A1* | 6/2013 | Norrman | H04L 9/3271 380/44 |
| 2014/0119544 | A1* | 5/2014 | Lee | H04L 63/12 380/270 |

OTHER PUBLICATIONS

International Search Report (PCT/ISA/210) and Written Opinion (PCT/ISA/237) dated Sep. 4, 2017, by the European Patent Office as the International Searching Authority for International Application No. PCT/EP2017/069073.
Leu, et al., "Improving security level of LTE authentication and key agreement procedure", 2012 IEEE Globecom Workshops, Dec. 2012, pp. 1032-1036.
Menezes, et al., "Handbook of Applied Cryptography", Handbook of Applied Cryptography; [Crc Press Series on Discrete Mathematics and its Applications], Jan. 1997, pp. 567-570.
Van Den Broek, et al., "Defeating IMSI Catchers", Proceedings of the 22nd ACM Sigsac Conference on Computer and Communications Security, Jan. 2015, pp. 340-351.

* cited by examiner

AUTHENTICATION SERVER OF A CELLULAR TELECOMMUNICATION NETWORK AND CORRESPONDING UICC

FIELD OF THE INVENTION

The field of the invention is that of telecommunications in cellular networks (3G (UMTS), 4G networks (LTE) or future (5G) networks).

BACKGROUND

A particular goal of these networks is to help establish communications between terminals communicating with security elements (UICC, eUICC, USIM, . . . ).

These security elements are usually in the form of removable cards of their terminals, usually consisting of mobile phones, smartphones, PDAs, . . . . There are also security elements integrated in modem part terminals or machines (therefore non-extractable), these machines being vehicles, beverage vending machines, etc. . . . .

More precisely, the invention concerns authentication in such networks. An application, called USIM and stored on a (e)UICC has the goal to authenticate the user equipment when the user tries to connect to a UMTS or LTE network. Such an application identifies uniquely a user and his mobile operator by using the IMSI stored in the security element. It is also necessary in such networks that the network authenticates the security elements.

Authentication allows to verify that the identity (IMSI or TMSI) transmitted by the terminal communicating with the SIM card on the radio path is correct to protect on one hand the operator against the fraudulent use of its resources, and on another hand subscribers by prohibiting unauthorized third parties to use their accounts. The authentication of the subscriber may be required by the mobile network every last location update, call setup (incoming or outgoing) and before enabling or disabling some services. It is also required during the implementation of the encryption key on some dedicated channels.

The GSM authentication is based on a protocol of challenge/response and on secret key cryptography algorithms. However, in a GSM scheme, the network authenticates the SIM card but the SIM card does not authenticate the network. The SIM card of the terminal is not able to verify the identity and the validity of the network to which the mobile is attached.

The authentication mechanism used in a 3G network (UMTS) or 4G network (LTE) is a mutual authentication (the terminal authenticates the network and the network authenticates the terminal).

The 3G authentication (AKA for Authentication and Key Agreement) is based on a shared key K that is only present in an element of the network called HLR (Home Location Register) and the USIM. As the HLR never communicates directly with the terminal, the VLR of the MSC server performs the authentication procedure. The VLR therefore stands for an authentication server.

One to five authentication vectors (AV, Authentication Vector) are downloaded by the MSC server from the HLR when the MSC server receives from the terminal a request for attachment.

The parameters in the AV are:
RAND—the challenge which serves as one of the input parameters to generate the 4 other AV settings. RAND is coded on 128 bits;
SRES—the expected result, used by the network to the USIM authentication (32 to 128 bits);
AUTN—the authentication token used by the USIM for network authentication (128 bits);
CK—the session key used for encryption of communications (128 bits);
IK—an integrity key (128 bits) to protect the integrity of the signaling between the terminal and the RNC ("Radio Network Controller"), the element of the UMTS network that controls radio transmissions stations basic—the RNC manages the allocation of the radio resource, encrypting data before sending to the terminal, as well as part of the location of subscribers).

F1 to f5 algorithms are used to generate these parameters (see FIG. 1). A MAC (64 bits) is generated (to help the terminal to authenticate the network, not necessarily the VLR). AK is an anonymity key generated from RAND and K.

The AuC generates an authentication vector from the key K terminal it shares with the USIM and two other parameters: A sequence number SQN (48 bits) and the pseudo random number RAND.

SQN is a counter arranged in the HLR/AuC and is individual for each USIM. For its part, the USIM keeps track of a counter sequences called by SQuicc suite which is the largest sequence number the USIM has accepted.

The authentication vector generated five parts: the random value (RAND), the result (RES) that will be required in the process challenge/response with the USIM, the authentication token (AUTN) for authentication network to the USIM, the session key (CK) to be used for encryption and integrity control key (IK) which serve to protect the integrity of signaling messages.

The authentication token AUTN equals: AUTN=SQN⊕AK∥AMF∥MAC
with AK=f5 (RAND, K), AMF (16 bits) an authentication management field, ∥ represents a concatenation and ⊕ the XOR function.

After transmission of the IMSI to the HLR/AuC, the VLR, upon receiving the fivefold (RAND, AUTN, XRES, CK, IK), transmits the challenge RAND and the authentication token AUTN it received from the HLR to the USIM and waits for a response RES.

At the USIM, like shown if FIG. 2, MAC, AMF and SQN⊕AK are retrieved from AUTN. It then calculates f5 (RAND, K)=AK and deduces SQN.

If SQuicc is too far from SQN (not included in a certain range), the USIM performs a resynchronization phase with the network.

If SQuicc is not too far from SQN (included in the above range), it calculates XMAC=f1 (K, RAND, SQN) and compares it to MAC. If they are equal, the network is authenticated by the USIM.

The USIM also calculates RES using RAND and K to the algorithm f2. The session key CK is also calculated using RAND and the key K from the USIM with the f3 algorithm.

Challenge/response can be summarized as follows: The USIM is authenticated by the VLR if the result RES calculated by the USIM and transmitted to the VLR is the same XRES received from the HLR/AuC. The authentication token AUTN therefore allows the USIM to check whether the AuC is authentic and that it is not an attack type "man in the middle" by the access network. Furthermore, if RES is equal to XRES, the VLR considers that the mutual authentication is successful. Mutual authentication is thus obtained between the network and the USIM.

This authentication mechanism is described in 3GPP TS 33.102 (for example in its 13.0.0 version dated January 2016).

The 3GPP organization has been requested to provide network coverage for Public Safety organization in case of disaster or during public safety operations where 3GPP radio coverage by national operators are not present. For example, in the case of a natural disaster, for example a hurricane, all connections to an existing fixed Long Term Evolution (LTE) network infrastructure may be lost. Such kind of operations are call Isolated Operation for Public Safety (IOPS) as the local eNB does not have access to the core network (HLR/AUC) to authenticate the mobile user.

IOPS is specified in annex K of ETSI TS 123 401 V13.6.1 from May 2016 (LTE; General Packet Radio Service (GPRS) enhancements for Evolved Universal Terrestrial Radio Access Network (E-UTRAN) access.

When connectivity between the eNB (LTE base station) and the fixed LTE network infrastructure is lost, authentication of the user equipment cannot be performed. To provide communications during an emergency, deployable LTE infrastructure may be temporarily installed and activated to provide temporary LTE coverage. When activated, the deployable LTE infrastructure is not connected to the fixed LTE network infrastructure and the deployable LTE infrastructure may remain active for an extended amount of time while the fixed LTE network infrastructure is being returned to service.

LTE networks include, among other components, databases such as a Home Subscriber Server (HSS) that stores user-related and subscription-related information. For example, the fixed HSS is configured to store the IMSI (International Mobile Subscriber Identity) and a related authentication key (K) used to identify and authenticate a subscriber on a communication device (such as a mobile phone or a computer).

The deployable system may be provided in a mobile environment, for example on a truck. For the deployable system to successfully complete network access authentication of communication devices, the deployable system must maintain its own HSS when there is no connectivity to the fixed LTE network infrastructure. The deployable HSS is also configured to store user-related and subscription-related information.

However, the current solution proposed by 3GPP to Public Safety organizations (UK Home Office, US Department of Commerce, Ministry of Interior, France) is not fulfilling completely the requirements. The solution today only allows 50 to 60 different IOPS local networks to operate over a country/state, where a rough estimate would require 10 or 15 times more. In a country like France for instance, there are approximately 100 departments which may have local police, firemen, first rescuer force, gendarmerie, etc. . . . and each of these entities needs a HSS/AUC in for instance each department.

The current solution is based on a diversification of one long term IOPS key Ki (Ki1 for the local police, Ki2 for the firemen, . . . ) into 50 to 60 IOPS local keys K (one for each IOPS local network). The key indexation and diversification is based on the Authentication Management Field (AMF) in the AUTN packet of the authentication vector (see 3GPP TS 33.102). Each IOPS local key K is pre-shared (stored) in the local IOPS HSS/AUC and in the USIM that is allowed to access the corresponding IOPS Local network.

The limitation comes from the available bits in the AMF in the 3GPP authentication mechanism to provide the USIM with the IOPS Local Network Identifier: The AMF can contain 16 bits but 10 are reserved for the MNOs and thus only 6 bits are available in the AMF for identifying IOPS local networks.

The maximum number of IOPS local networks able to operate (ideally $2^6=64$) is therefore in many cases not sufficient.

The present invention proposes a solution to this problem.

SUMMARY

The invention proposes an authentication server of a cellular telecommunication network, the authentication server being arranged for generating an authentication token to be transmitted to a telecommunication terminal, the authentication token comprising a message authentication code and a sequence number, wherein the message authentication code is equal to:

$$MACx = KIdx \text{ XOR } f1(AMF, SQNx, RAND, K)$$

with KIdx being a key index information in the form of a bias of a MAC equal to:

$$MAC = f1(K, AMF, SQNx, RAND)$$

with f1 being a function, K a key, RAND a random number and SQNx a sequence counter relative to a corresponding key Kx derived from the key K and KIdx, and AMF the content of an authentication management field as defined in 3GPP TS 33.102.

Preferably, the authentication server also computes an authentication vector to be transmitted to the telecommunication terminal, the authentication vector being equal to:

$$AVx = RAND\|XRESx\|CKx\|IKx\|AUTNx$$

With:

$$XRESx = f2(RAND, Kx)$$

$$CKx = f3(RAND, Kx)$$

$$AUTNx = SQNx \text{ XOR } AK\|AMF\|MACx$$

$$AK = f5(RAND, K)$$

Advantageously, the authentication server is a IOPS authentication server. The invention also concerns a Universal Integrated Circuit Card (UICC) comprising a Universal Subscriber Identity Module (USIM application), the USIM application being configured to receive from a telecommunication terminal with which it cooperates a message $$AUTNx\|RAND$$

with RAND a random number and AUTNx being equal to:

$$AUTNx = SQNx \text{ XOR } AK\|AMF\|MACx$$

with AK=f5(RAND,K)
and MACx being equal to:

$$MACx = KIdx \text{ XOR } f1(AMF, SQNx, RAND, K)$$

with KIdx being a key index information in the form of a bias of a MAC equal to:

$$MAC = f1(K, AMF, SQNx, RAND)$$

with f1 and f5 being functions, K a key, SQNx a sequence counter relative to a corresponding key Kx derived from the key K and KIdx, and AMF the content of an authentication management field as defined in 3GPP TS 33.102, the application computing a value $$XMAC=f1(AMF,SQNx,RAND,K)$$

and a Key Index $$KId=XMAC\ XOR\ MACx$$

the application verifying that the computed KId matches one of the KIds in a stored white list and, if the match is positive, computing the corresponding key Kx based on the KIdx and computing the key AK, SQNx and $$RESx=f2(Kx,RAND)$$

$$CKx=f3(Kx,RAND)$$

$$IKx=f4(Kx,RAND)$$

and sending RESx, CKx and IKx to the telecommunication terminal.

BRIEF DESCRIPTION OF THE DRAWING

Other particularities and advantages of the invention will appear when reading an advantageous embodiment of the invention, which is given as an illustration and not a limitation, and referring to the appended drawings, wherein.

DETAILED DESCRIPTION OF THE DRAWINGS

Figure 1:
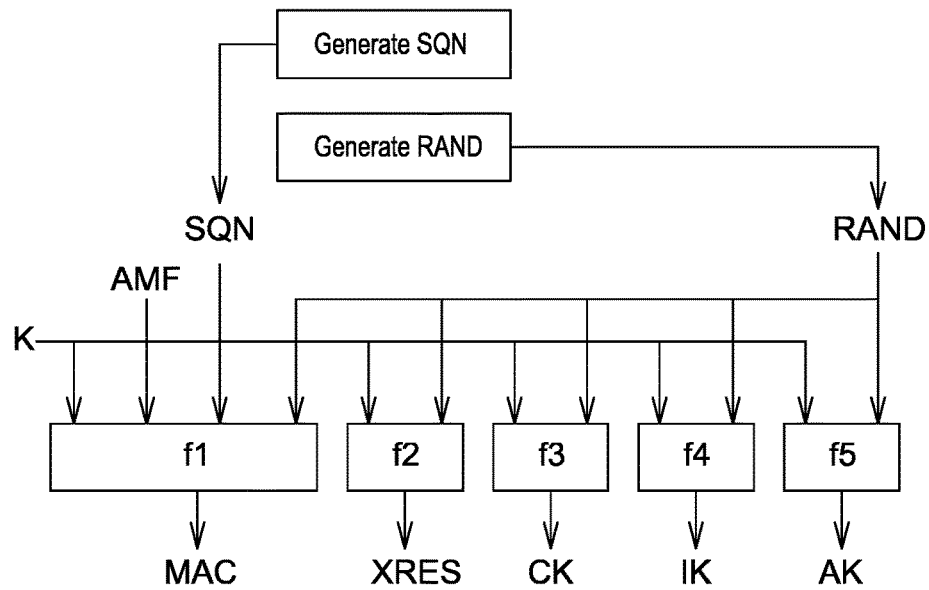
FIG. 1 represents the generation of AUTN and authentication vectors AV at the level of the HSS/AUC.
Figure 2:
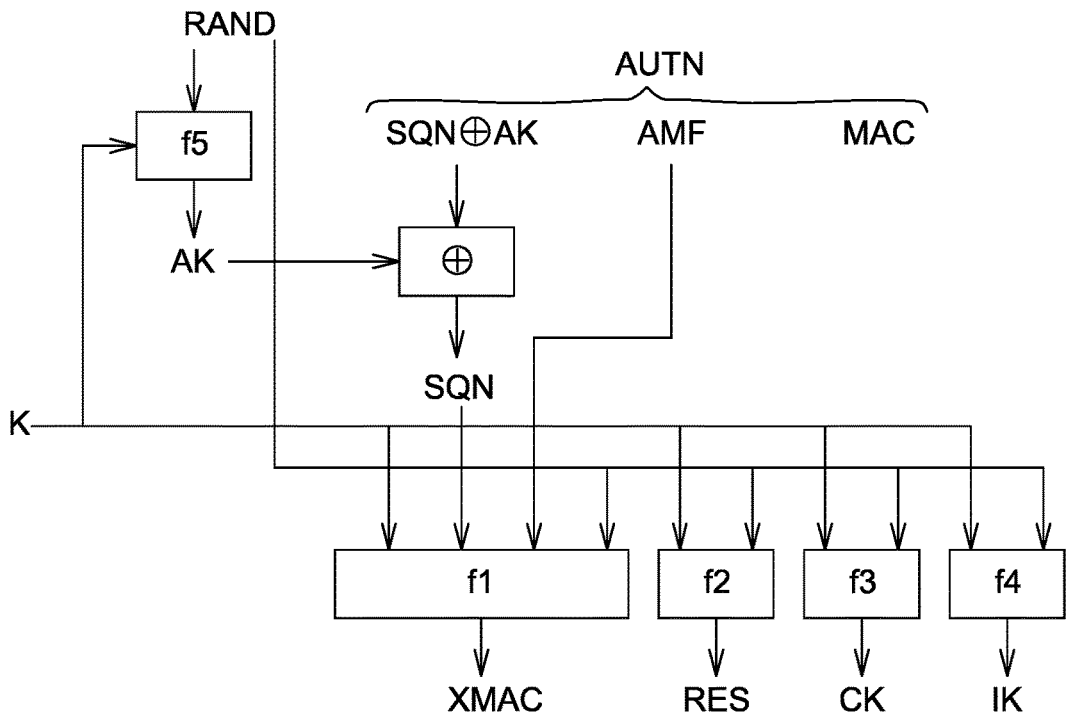
FIG. 2 represents the authentication by a USIM of the HSS/AUC of a network operator.

FIGS. 1 and 2 have been described previously in regard to the state of the art.

Figure 3:
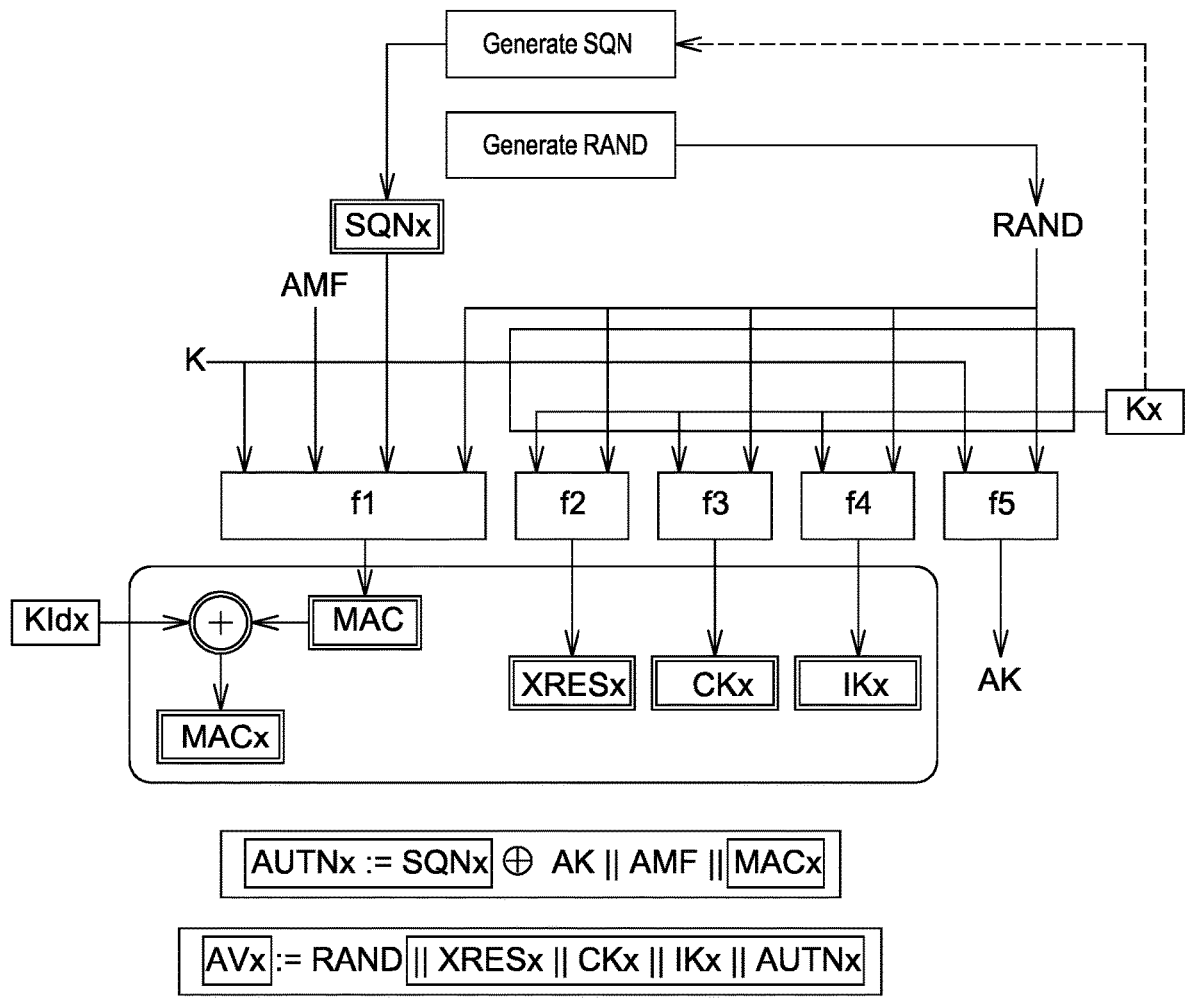
FIG. 3 represents a preferred embodiment of the present invention, obtained at the level of a HSS/AUC.

FIG. 3 represents a preferred embodiment of the present invention, obtained at the level of a HSS/AUC.

Regarding this figure in comparison to FIG. 1, the differences are the following:

A new key Kx is used for generating SQNx (instead of SQN), XRESx (instead of XRES), CKx (instead of CK), IKx (instead of IK) and another key index KIdx is used to diversify the MAC for obtaining a value MACx.

The invention consists in the Authentication Server (HSS/AUC) to inject an additional Key Index information (KIdx) in the form of a bias in the MAC part (MACx) of the AUTN that is sent to the USIM. The additional Key Index information allows additional keys to be generated and indexed without changing the existing authentication protocol.

The Key Index Injection algorithm is described by the following equations for a given KIdx:

K is computed based on the AMF as it is proposed in 3GPP TS 33.102. It is a diversified key from the long term key as defined for IOPS.

Kx=Deriv(KIdx,K). For instance Kx=HMAC-SHA-256 (K, KIdx).

SQNx=Generated relative to the corresponding key Kx. For instance, SQNx is a sequence number that is incremented by 1 every times an authentication vector is generated based on the key Kx.

MACx=KIdx XOR f1(AMF,SQNx,RAND,K)
AK=f5(RAND,K)
AUTNx=SQNx XOR AK||AMF||MACx
XRESx=f2(RAND,Kx)
CKx=f3(RAND,Kx)
IKx=f4(RAND,Kx)
AVx=RAND||XRESx||CKx||IKx||AUTNx

Here follows some examples showing how a MAC is transformed into a MACx:

For MAC (64-bit)=0x1122334455667788 and KIdx=0x2222222222222222,
MACx (64-bit)=0x33001166774455AA.

For MAC (64-bit)=0x1122334455667788 and Kidx=0x5151515151515151,
MACx (64-bit)=0x40736215043726D9.

Kx is for example diversified or is for example a random number.

KIdx is a key index information corresponding to Kx.

Once the Authentication vectors are generated by the HSS/AUC (upon authentication procedure of the USIM), they are sent to the Mobility Management Entity (MME), which manages locally the authentication and authorization of the USIM/Mobile.

Figure 4:
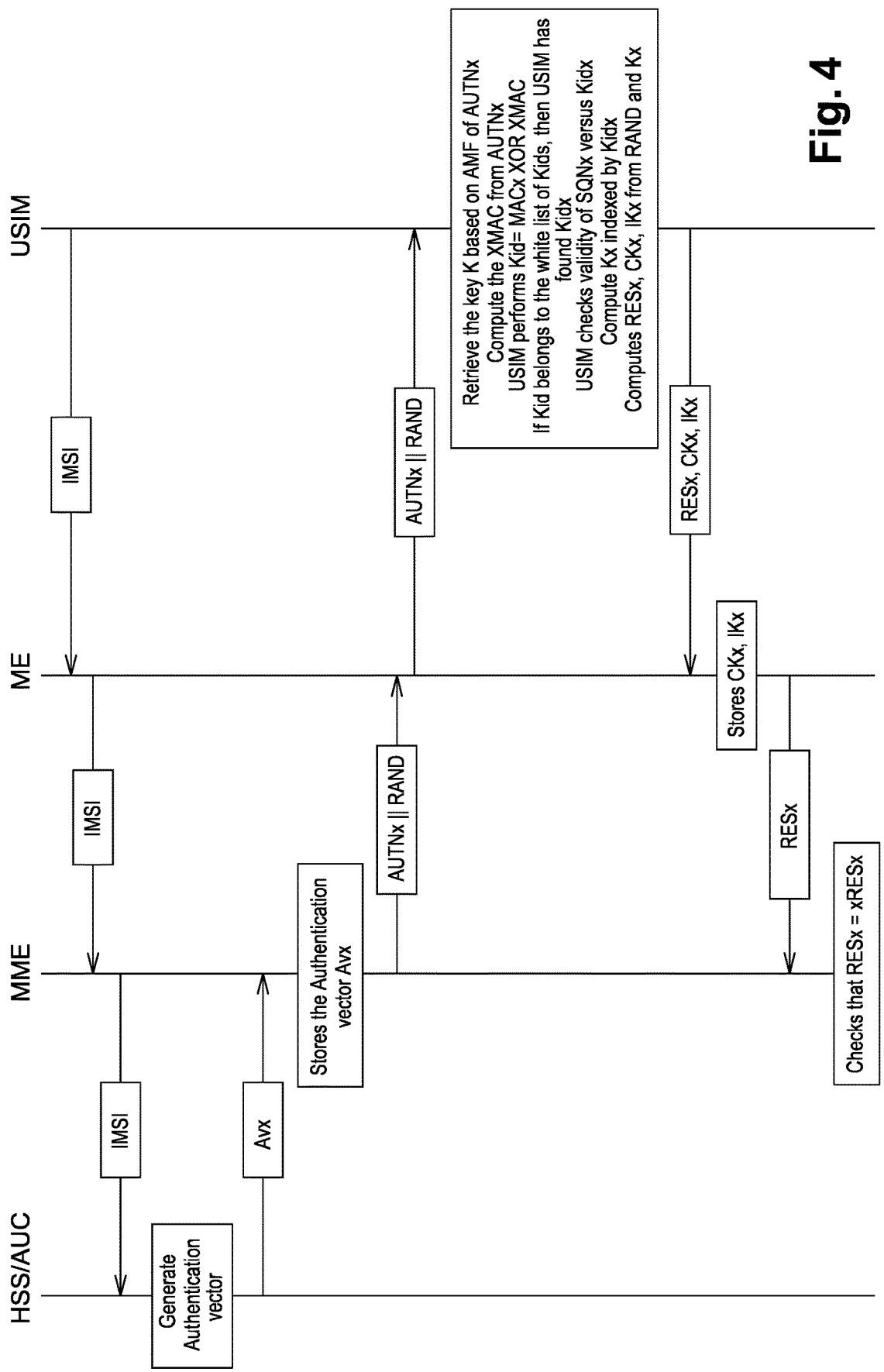
FIG. 4 represents the mutual authentication method according to the invention.

FIG. 4 represents the mutual authentication method according to the invention.

Four entities are here represented: The HSS/AUC, the MME, the telecommunication terminal ME and the USIM.

For authentication purposes, the USIM first sends its IMSI to the HSS/AUC through the ME and the MME. The HSS/AUC generates the Authentication Vectors AVx locally, and sends these vectors to the MME. The MME stores the AVx locally and sends the (RAND, AUTNx) pair to the USIM.

Upon reception, the USIM retrieves the AMF information from AUTNx (with AUTNx=SQNx XOR AK||AMF-||MACx).

Based on the AMF information, the USIM verifies if the long term key must be derived in an IOPS key K. If yes, it computes the IOPS key K.

The USIM computes the expected XMAC with f1: XMAC=f1(AMF,SQNx,RAND,K) and the Key Index KId=XMAC XOR MACx. MACx is extracted from AUTNx.

The USIM verifies that the computed KId is an acceptable value. For instance the computed KId matches one of the KIds in a stored white list of KIds. If this match is positive, the matched Kid is the injected KIdx. The white list of KIds is a list of KIdx that are acceptable by the USIM. This list may be provisioned in the USIM at manufacturing of the USIM or downloaded to the USIM over the air during operation. In other embodiments, the acceptable KIds may be KIds satisfying some given conditions e.g. KIds which number of bits set to 1 is equal to 6.

The USIM computes/retrieves the corresponding key Kx based on the KIdx and computes the key AK=f5(RAND,K), deciphers SQNx from AUTNx, and verifies that SQNx is coherent with Kx to prevent replay attacks.

The USIM then compute RESx, CKx, IKx based on RAND and Kx.

The USIM returns RESx, CKx and IKx to the ME.

The ME stores CKx and IKx (since it does not know the long term key), and sends RESx as the response to the challenge to the MME.

The MME then compares the received RESx with its expected value XRESx.

The authentication process is successful if XRESx and RESx are equal. Otherwise, authentication of the USIM is considered as failed.

The invention allows additional keys to be indexed in the Isolated Operation for Public Safety use case.

The additional indexation re-uses the same authentication protocol, so that messages exchange between the various entities: HSS/AUC, MME, ME, USIM are unchanged.

As the Key Index is injected as a bias to the MAC, the retrieval process consists in performing a lookup of the retrieved bias in a white list. This does not require recalculation of the MAC or keys.

The invention lifts the limitations in the 3GPP authentication mechanism to more IOPS Local Networks to be deployed without key collisions. It can be used for Public Safety Isolated Operation use cases, but can also be used in consumer/commercial use cases.

The invention claimed is:

1. An authentication server device of a cellular telecommunication network comprising:
   a memory that stores a Key K,
   wherein said authentication server generates an authentication token and transmits the authentication token to a telecommunication terminal, said authentication token comprising a message authentication code and a sequence number, wherein said message authentication code is equal to:

$MACx = KIdx \text{ XOR } f1(AMF, SQNx, RAND, K)$ with KIdx being a key index information in the form of a bias of a MAC equal to:

$MAC = f1(K, AMF, SQNx, RAND)$ with f1 being a function, the key K, RAND a random number and SQNx a sequence counter relative to a corresponding key Kx derived from the key K and KIdx, and AMF the content of an authentication management field as defined in 3GPP TS 33.102.

2. The authentication server device according to claim 1, wherein said authentication server computes an authentication vector and transmits the authentication vector to said telecommunication terminal, said authentication vector being equal to:

$AVx = RAND \| XRESx \| CKx \| IKx AUTNx$

With: $XRESx = f2(RAND, Kx)$ $CKx = f3(RAND, Kx)$ $AUTNx = SQNx \text{ XOR } AK \| AMF \| MACx$ $AK = f5(RAND, K)$ with $\|$ being a concatenation, and f2, f3 and f5 being algorithms.

3. The authentication server according to claim 1, wherein said authentication server is an Isolated Operation for Public Safety (IOPS) authentication server.

4. A Universal Integrated Circuit Card (UICC) comprising:
   a memory that stores a Universal Subscriber Identity Module (USIM) application, said USIM application being configured to receive from a telecommunication terminal, with which it cooperates, a message $AUTNx \| RAND$ with RAND a random number and AUTNx being equal to:

$AUTNx = SQNx \text{ XOR } AK \| AMF \| MACx$ with $AK = f5(RAND, K)$
   and MACx being equal to:

$MACx = KIdx \text{ XOR } f1(AMF, SQNx, RAND, K)$ with KIdx being a key index information in the form of a bias of a MAC equal to:

$MAC = f1(K, AMF, SQNx, RAND)$ with f1 and f5 being functions, K a key, SQNx a sequence counter relative to a corresponding key Kx derived from the key K and KIdx, and AMF the content of an authentication management field as defined in 3GPP TS 33.102,
   said application computing a value $XMAC = f1(AMF, SQNx, RAND, K)$ and a Key Index $KId = XMAC \text{ XOR } MACx$ said application verifying that the computed KId matches one of the KIds in a stored white list and, if the match is positive, computing the corresponding key Kx based on the KIdx and computing said key AK, SQNx and $RESx = f2(Kx, RAND)$ $CKx = f3(Kx, RAND)$ $IKx = f4(Kx, RAND)$ with $\|$ being a concatenation and f2, f3 and f4 being algorithms, and sending RESx, CKx and IKx to said telecommunication terminal.

* * * * *